(12) United States Patent
Wataishi

(10) Patent No.: US 9,696,955 B2
(45) Date of Patent: Jul. 4, 2017

(54) INFORMATION PROCESSING APPARATUS, PRINTING SYSTEM, AND PRINTING METHOD INCLUDING TRANSMITTING OUTPUT DATA TO AN OUTPUT APPARATUS ASSOCIATED WITH A CLIENT APPARATUS

(75) Inventor: Saki Wataishi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/350,862

(22) PCT Filed: Sep. 6, 2012

(86) PCT No.: PCT/JP2012/073394
§ 371 (c)(1),
(2), (4) Date: Apr. 10, 2014

(87) PCT Pub. No.: WO2013/058040
PCT Pub. Date: Apr. 25, 2013

(65) Prior Publication Data
US 2014/0253973 A1    Sep. 11, 2014

(30) Foreign Application Priority Data
Oct. 20, 2011 (JP) .................. 2011-230961

(51) Int. Cl.
*G06F 15/00* (2006.01)
*G06F 3/12* (2006.01)

(52) U.S. Cl.
CPC .......... *G06F 3/1286* (2013.01); *G06F 3/1204* (2013.01); *G06F 3/1226* (2013.01); *G06F 3/1267* (2013.01); *G06F 3/1288* (2013.01)

(58) Field of Classification Search
CPC .... G06F 3/1286; G06F 3/1288; G06F 3/1267; G06F 3/1226; G06F 3/1204
See application file for complete search history.

(56) References Cited

U.S. PATENT DOCUMENTS

2005/0102442 A1* 5/2005 Ferlitsch ............... G06F 3/1204
710/15
2007/0027990 A1 2/2007 Nakaoka et al.
(Continued)

FOREIGN PATENT DOCUMENTS

| CN | 101290560 | 10/2008 |
|---|---|---|
| JP | 2002-189645 | 7/2002 |

(Continued)

OTHER PUBLICATIONS

International Search Report Issued on Oct. 9, 2012 in PCT/JP2012/073394 filed on Sep. 6, 2012.
(Continued)

*Primary Examiner* — Helen Q Zong
(74) *Attorney, Agent, or Firm* — IPUSA, PLLC

(57) ABSTRACT

An information processing apparatus is provided that includes a print data storage unit configured to store print data; a data list providing unit configured to transmit list information of the print data stored by the print data storage unit to a client apparatus via a network; a print request receiving unit configured to receive from the client apparatus selected print data identification information of selected print data selected from the list information; and a transmitting unit configured to transmit the selected print data corresponding to the selected print data identification information to an image forming apparatus via the network.

11 Claims, 17 Drawing Sheets

(56) References Cited

U.S. PATENT DOCUMENTS

| | | | |
|---|---|---|---|
| 2008/0158597 A1* | 7/2008 | Hashimoto | G06F 21/608 |
| | | | 358/1.15 |
| 2008/0204798 A1 | 8/2008 | Taniguchi et al. | |
| 2008/0259399 A1 | 10/2008 | Wada | |
| 2008/0304101 A1 | 12/2008 | Sasase | |
| 2011/0002009 A1* | 1/2011 | Ohashi | 358/1.15 |
| 2011/0122437 A1* | 5/2011 | Shimohira | 358/1.15 |
| 2011/0157631 A1 | 6/2011 | Tsutsumi | |

FOREIGN PATENT DOCUMENTS

| | | |
|---|---|---|
| JP | 2007-230144 | 9/2007 |
| JP | 2008-129812 | 6/2008 |
| JP | 2008-204389 | 9/2008 |
| JP | 2008-305262 | 12/2008 |
| JP | 2011-014064 | 1/2011 |
| JP | 2011-081741 | 4/2011 |
| JP | 2011-138396 | 7/2011 |

OTHER PUBLICATIONS

Extended European search report dated Feb. 27, 2015.
Japanese Office Action dated Dec. 22, 2015.
Chinese Office Action dated Jul. 7, 2016.
Japanese Office Action dated Jun. 7, 2016.
Japanese Office Action dated Jan. 24, 2017.

* cited by examiner

FIG.6

| CLIENT IDENTIFICATION INFORMATION | APPARATUS IDENTIFICATION INFORMATION |
|---|---|
| 133.139.22.163 | 133.139.22.186 |
| 133.139.22.139 | 133.139.22.222 |
| 133.139.22.162 | 133.139.22.234 |

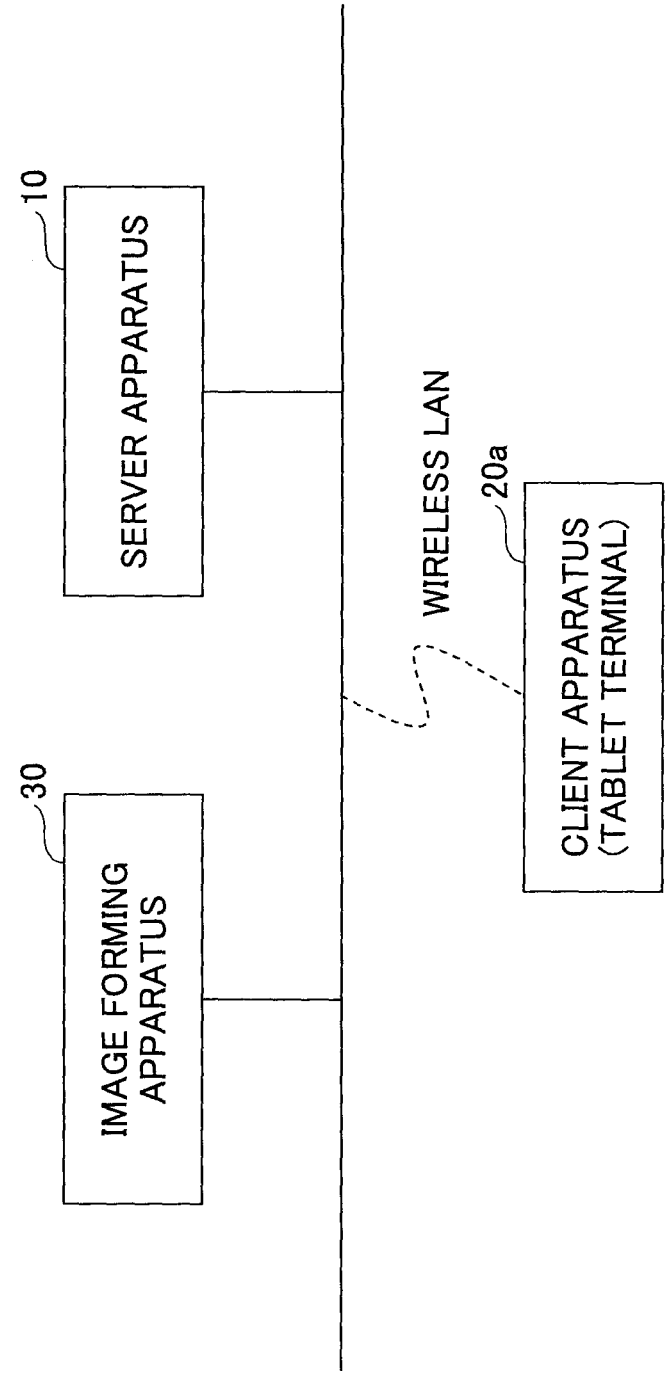

FIG.11

PRINT JOB HAS BEEN COMPLETED.

OK

| CLIENT IDENTIFICATION INFORMATION | APPARATUS IDENTIFICATION INFORMATION |
|---|---|
| 133.139.22.163 | 133.139.22.186, 133.139.22.222, 133.139.22.234 |
| 133.139.22.139 | 133.139.22.56, 133.139.22.163, 133.139.231.72, 133.139.22.166 |
| 133.139.22.162 | 133.139.22.234, 133.139.22.56 |

FIG.16

| APPARATUS IDENTIFICATION INFORMATION | APPARATUS POSITION INFORMATION |
|---|---|
| 133.139.22.56 | 72, 35.598354, 139.705445 |
| 133.139.22.163 | 20, 35.597922, 139.705356 |
| 133.139.231.44 | 20, 35.597769, 139.706011 |

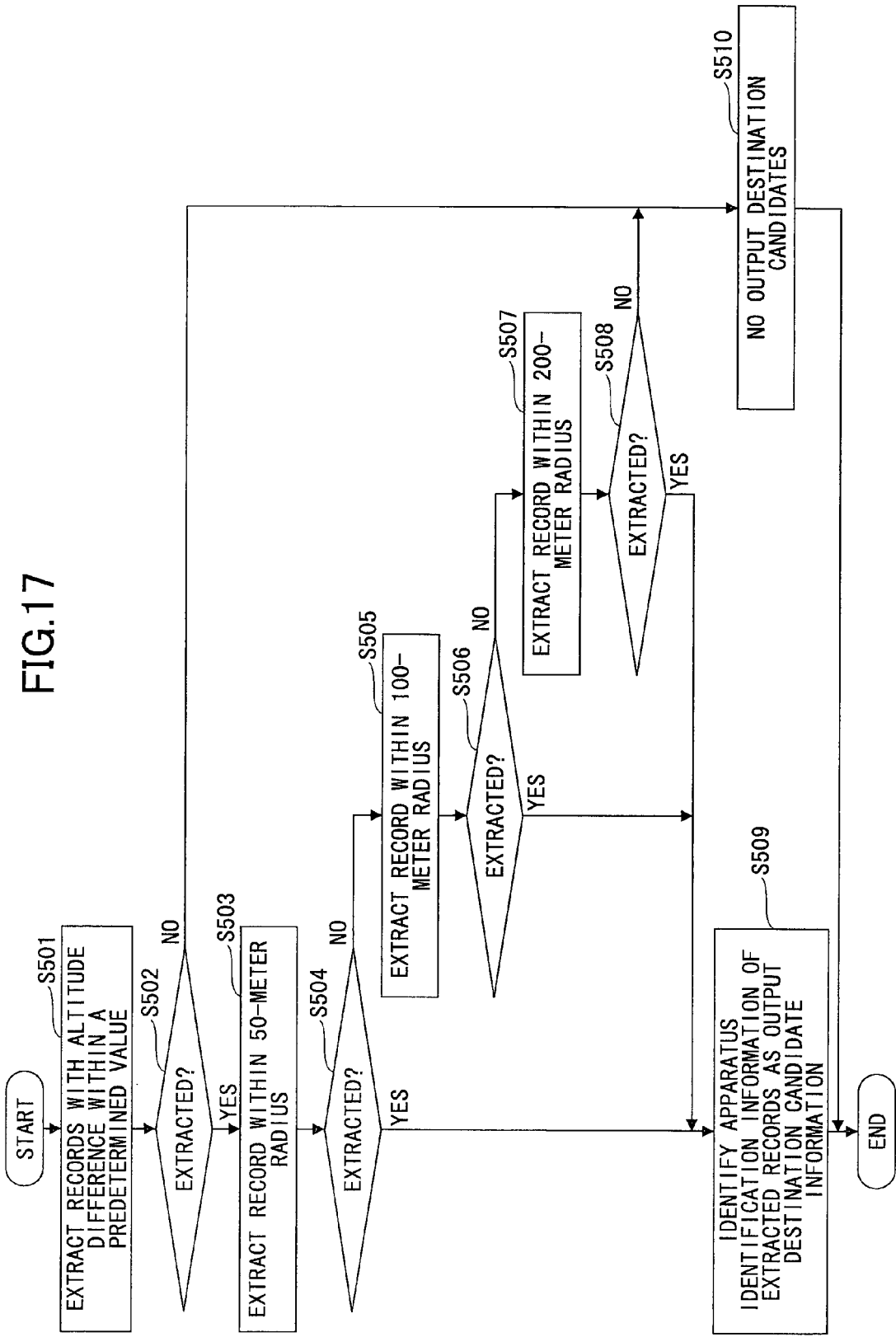

INFORMATION PROCESSING APPARATUS, PRINTING SYSTEM, AND PRINTING METHOD INCLUDING TRANSMITTING OUTPUT DATA TO AN OUTPUT APPARATUS ASSOCIATED WITH A CLIENT APPARATUS

TECHNICAL FIELD

The present invention relates to an information processing apparatus, a printing system, and a printing method.

BACKGROUND ART

A printing system is known that does not immediately print out print data transmitted from a host computer. That is, print data transmitted from the host computer are spooled (accumulated) at a server apparatus. Then, at a suitable timing for the user, print data to be output may be selected from a list of spooled print data. The selected print data are transmitted to an image forming apparatus so that the image forming apparatus may execute a print job.

PRIOR ART REFERENCE

Japanese Laid-Open Patent No. 2008-129812

DISCLOSURE OF THE INVENTION

Problems to be Solved by the Invention

In a printing system as described above, it has been difficult to provide uniform operability across image forming apparatuses of different manufacturers and models. For example, software specifications for enabling such a printing system may differ depending on the manufacturer, and the forms and functions of the operations panel of an image forming apparatus may differ depending on the model of the image forming apparatus. In some image forming apparatus models such as those that have relatively small operations panels or those that do not have operations panels, it may be difficult to display the list of print data.

It is a general object of at least one embodiment of the present invention to provide an inkjet recording apparatus that substantially obviates one or more problems caused by the limitations and disadvantages of the related art. In one aspect of the present invention, an information processing apparatus, a printing system, and a printing method that enable uniform operability for printing accumulated print data are provided.

Means for Solving the Problems

In one embodiment of the present invention, an information processing apparatus includes a print data storage unit configured to store print data; a data list providing unit configured to transmit list information of the print data stored by the print data storage unit to a client apparatus via a network; a print request receiving unit configured to receive from the client apparatus selected print data identification information of selected print data selected from the list information; and a transmitting unit configured to transmit the selected print data corresponding to the selected print data identification information to an image forming apparatus via the network.

Effects of the Present Invention

In one aspect of the present invention, uniform operability may be provided for printing accumulated print data.

BRIEF DESCRIPTION OF THE DRAWINGS

FIG. 6 is a table showing an exemplary configuration of a determination information storage unit according to the first embodiment;

FIGS. 7A and 7B are diagrams illustrating exemplary implementations of the determination information storage unit according to the first embodiment;

FIG. 8 is a block diagram showing an exemplary configuration of a printing system according to a second embodiment of the present invention;

FIG. 11 is a diagram showing an exemplary print completion screen that may be displayed at a client apparatus according to the third embodiment;

FIG. 16 is a table illustrating an exemplary configuration of a determination information storage unit according to the fifth embodiment; and FIG. 17 is a flowchart showing an exemplary sequence of process steps for determining output destination candidates according to the fifth embodiment.

DESCRIPTION OF THE REFERENCE NUMERALS

1: PRINTING SYSTEM
10: SERVER APPARATUS
11: LIST INFORMATION PROVIDING UNIT
12: PRINT DATA ACQUIRING UNIT
13: PRINT REQUEST RECEIVING UNIT
14: OUTPUT DESTINATION DETERMINING UNIT

15: PRINT DATA TRANSMITTING UNIT
16: PRINT DATA STORAGE UNIT
17: DETERMINATION INFORMATION STORAGE UNIT
20: CLIENT APPARATUS
21: BROWSER UNIT
30: IMAGE FORMING APPARATUS
31: PRINT DATA RECEIVING UNIT
32: IMAGE FORMING UNIT
100: DRIVE DEVICE
101: STORAGE MEDIUM
102: AUXILIARY STORAGE DEVICE
103 MEMORY DEVICE
104: CPU
105: INTERFACE DEVICE
B: BUS

MODE FOR CARRYING OUT THE INVENTION

In the following, embodiments of the present invention are described with reference to the accompanying drawings.

Figure 1:
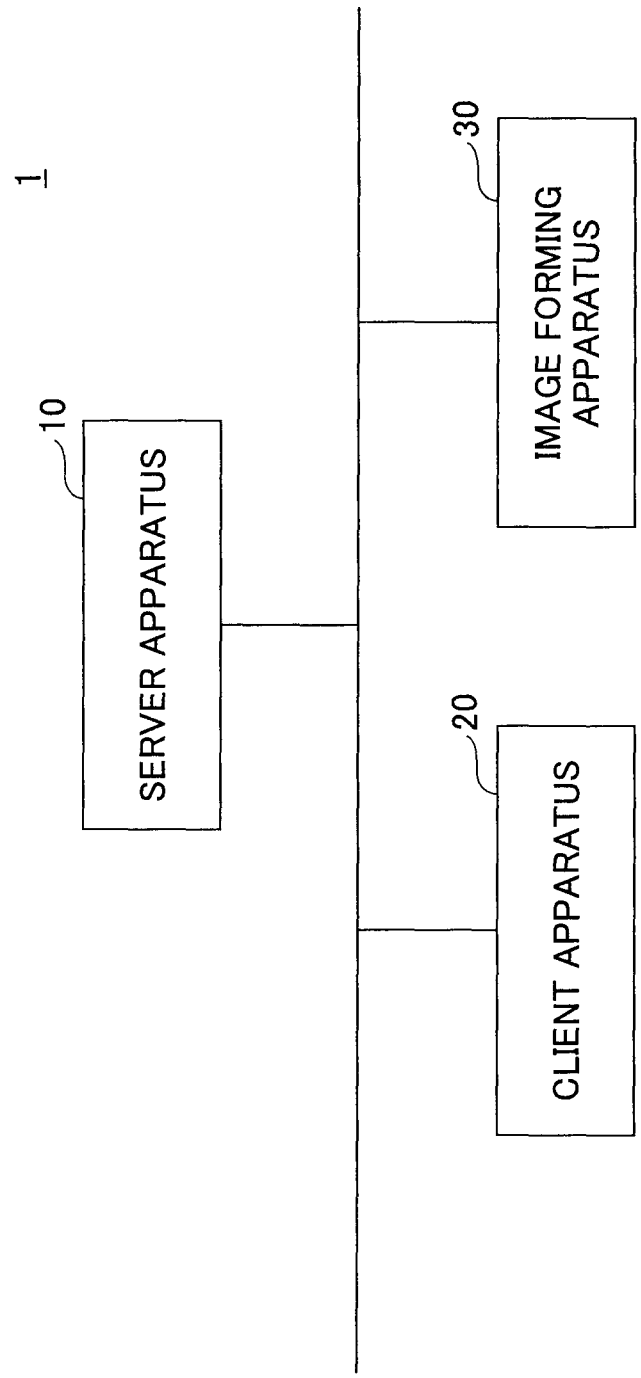
FIG. 1 is a diagram showing an exemplary configuration of a printing system according to a first embodiment of the present invention.

FIG. 1 is a diagram showing an exemplary configuration of a printing system according to an embodiment of the present invention. In FIG. 1, a printing system 1 includes a server apparatus 10, a client apparatus 20, and an image forming apparatus 30 that are interconnected via a network (wire or wireless) such as a local area network or the Internet to be in communication with one another.

In one preferred embodiment, the image forming apparatus 30 may be a multifunction peripheral that is capable of performing two or more of the following functions: printing, scanning, copying, and facsimile transmission. However, in another embodiment, a printer that merely has printing functions may be used as the image forming apparatus 30.

In one preferred embodiment, the client apparatus 20 may be a personal computer that receives selected print data to be output from print data accumulated in the server apparatus 10. It is noted that the client apparatus 20 is not limited to a personal computer and may be some other type of information processing apparatus, for example.

The server apparatus 10 is a computer that accumulates print data. The print data may be transmitted from the client apparatus 20 or an information processing apparatus (not shown) other than the client apparatus 20. In the present embodiment, print data such as electronic document data subject to a print command are not immediately transmitted to the image forming apparatus 30 but are first accumulated in the server apparatus 10. The server apparatus 10 transmits to the image forming apparatus 30 selected print data subject to an output command from the print data accumulated in the server apparatus 10. The image forming apparatus 30 executes a print job based on the transmitted print data.

The above printing mode is hereinafter referred to as "on-demand printing." In an on-demand printing system in which an output command for accumulated print data is issued at the operations panel of the image forming apparatus 30, security for printed matter may be ensured, for example. That is, a user may be right by the image forming apparatus 30 when the print result is output and may be able to immediately retrieve the print result so that information leakage due to exposure of the print result may be prevented, for example.

In the present embodiment, selection of the accumulated data is performed at the client apparatus 20. Thus, in order to prevent information leakage as described above, the client apparatus 20 is preferably located close to the image forming apparatus 30 corresponding to the output destination of the print result.

Figure 2:
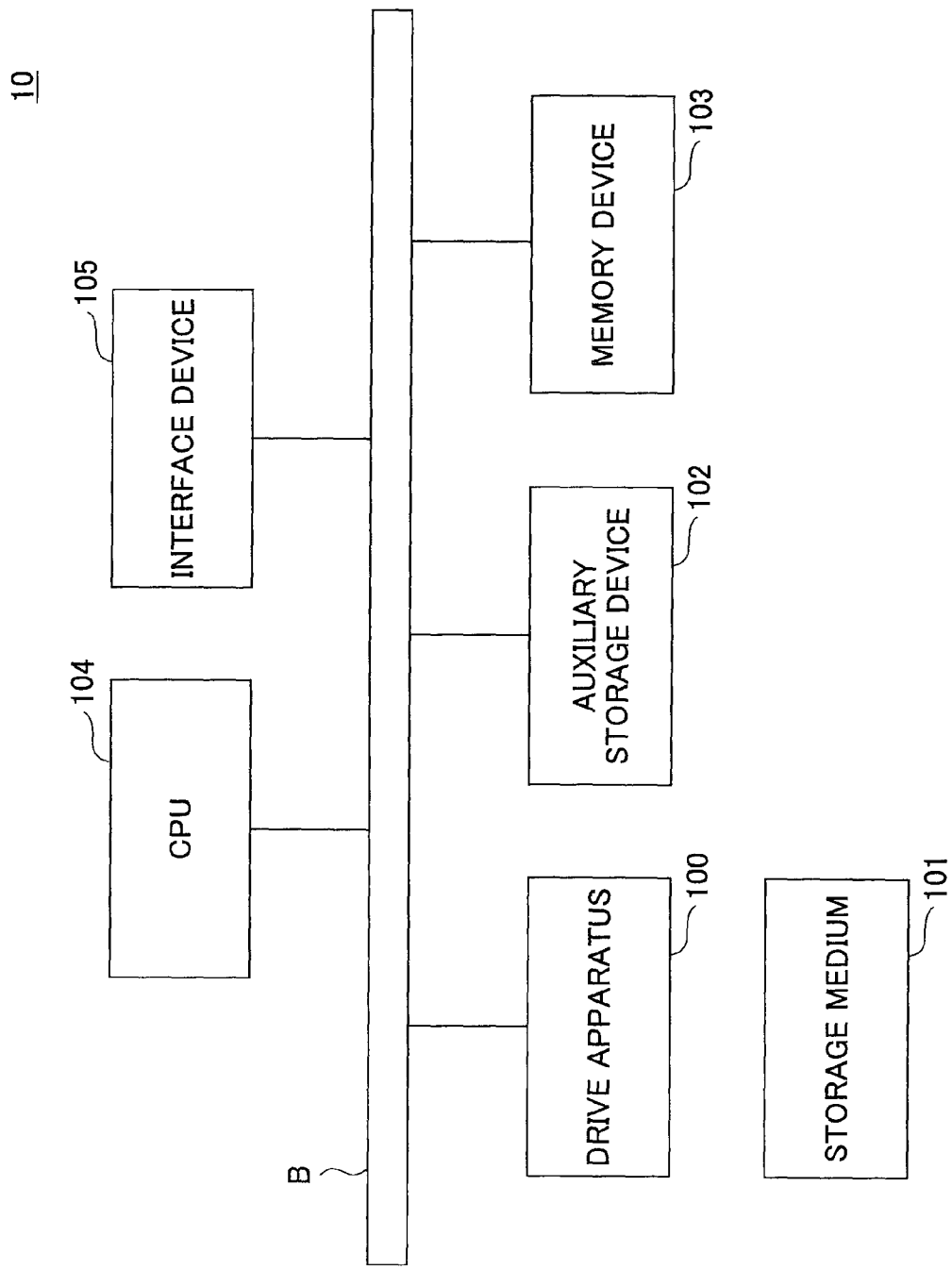
FIG. 2 is a diagram showing an exemplary hardware configuration of a server apparatus according to an embodiment of the present invention.

FIG. 2 is a diagram showing an exemplary hardware configuration of the server apparatus 10 according to an embodiment of the present invention. In FIG. 2, the server apparatus 10 includes a drive device 100, an auxiliary storage device 102, a memory device 103, a CPU 104, and an interface device 105 that are interconnected by a bus B.

In one preferred embodiment, a program for executing processes at the server apparatus 10 may be provided by a storage medium 101 such as a CD-ROM. The storage medium 101 storing such a program may be set in the drive device 100 so that the program may be installed in the auxiliary storage device 102 via the drive device 100. It is noted that the program does not necessarily have to be installed from the storage medium 101, and in other embodiments, the program may be downloaded from another computer via a network, for example. The auxiliary storage device 102 may store installed programs as well as files and data.

The memory device 103 reads a program from the auxiliary storage device 102 when there is an activation command for the program and stores the activated program. The CPU 104 executes functions of the server apparatus 10 according to a program stored in the memory device 103. The interface device 105 is an interface for establishing connection with a network.

In one embodiment, the client apparatus 20 and the image forming apparatus 30 may have hardware configurations similar to that shown in FIG. 2. In a preferred embodiment, the client apparatus 20 includes an input device such as a mouse and a keyboard for accepting operations commands from a user, and a display device for displaying screens prompting an operations command input and responses to the operations command, for example.

Figure 3:
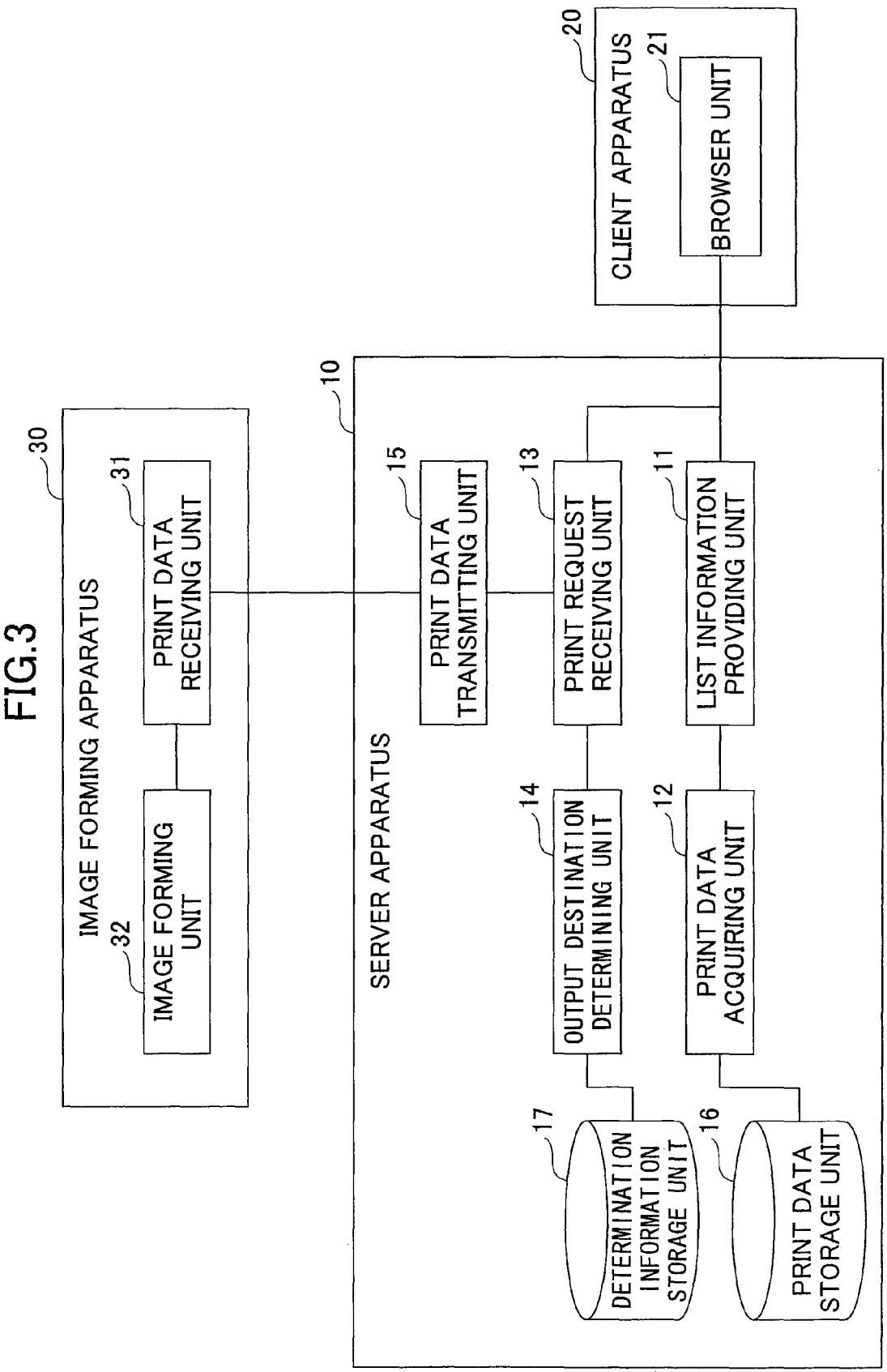
FIG. 3 is a diagram showing an exemplary functional configuration of a printing system according to the first embodiment.

FIG. 3 is a diagram showing an exemplary functional configuration of a printing system according to a first embodiment of the present invention. In FIG. 3, the server apparatus 10 includes a list information providing unit 11, a print data acquiring unit 12, a print request receiving unit 13, an output destination determining unit 14, and a print data transmitting unit 15. In a preferred embodiment, the above units may be implemented by one or more processes executed by the CPU 104 according to a program installed in the server apparatus 10. The server apparatus 10 also includes a print data storage unit 16 and a determination information storage unit 17. In a preferred embodiment, these storage units may be implemented by a storage device connected to the auxiliary storage device 102 or the server apparatus 10 via a network.

The list information providing unit 11 provides list information of the print data stored in the print data storage unit 16 to the client apparatus 20. The print data acquiring unit 12 acquires list information of print data stored in the print data storage unit 16 in response to a request from the list information providing unit 11.

The print request receiving unit 13 receives a print request that specifies the print data to be printed from the client apparatus 20. The output determining unit 14 determines the image forming apparatus 30 corresponding to the output destination (transmission destination) for the print data. The print data transmitting unit 15 transmits the print data to the image forming apparatus 30 that has been identified as the output destination (transmission destination). In a preferred embodiment, the print data transmitting unit 15 may transmit the print data using a standard communication protocol.

For example, the communication protocol used by the print data transmitting unit 15 to transmit print data to the image forming apparatus 30 may be the same communication protocol as that used by a printer driver of a personal computer to transmit print data to an image forming apparatus 30 corresponding to the output destination in response to a print command input to the personal computer.

The print data storage unit 16 is configured to store print data. In a preferred embodiment, the print data stored in the print data storage unit 16 may be in Page Description Language (PDL) format, which is the data format into which electronic data subject to a print command are converted by a printer driver of the client apparatus 20 or another information processing apparatus.

The determination information storage unit 17 stores information used by the output destination determining unit 14 to determine the image forming apparatus 30 corresponding to the print data output destination.

The image forming apparatus 30 includes a print data receiving unit 31 and an image forming unit 32. In a preferred embodiment, these units may be implemented by one or more processes executed by a CPU of the image forming apparatus 30 according to a program installed in the image forming apparatus 30. The print data receiving unit 31 receives print data transmitted from the server apparatus 10. The print data receiving unit 31 opens a port of a predetermined port number (e.g., Port 9100) and awaits reception of print data. The image forming unit 32 prompts the image forming apparatus 30 to execute printing processes based on the print data received by the print data receiving unit 31.

The client apparatus 20 includes a browser unit 21. The browser unit 21 may be implemented by one or more processes of a general or all-purpose web browser program that is executed by a CPU of the client apparatus 20. For example, the browser unit 21 may interpret the content of a webpage containing HyperText Markup Language (HTML) data and scripts and execute display processes based on the content.

In the following, process steps performed in the printing system according to an embodiment of the present invention are described.

Figure 4:
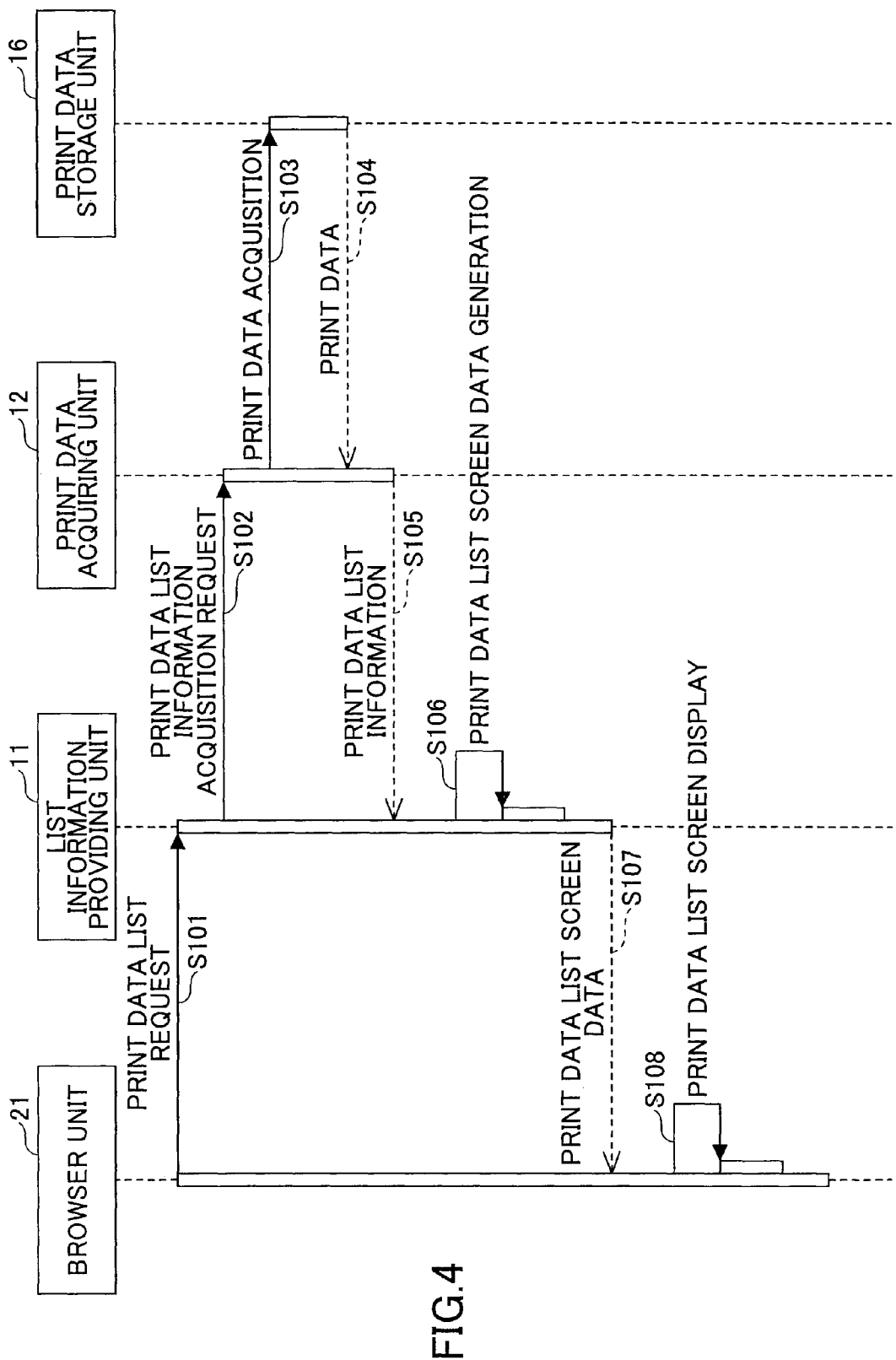
FIG. 4 is a sequence chart showing an exemplary sequence of process steps for displaying list information of print data.

FIG. 4 is a sequence chart showing an exemplary sequence of process steps for displaying list information of print data.

In an initial default state, the browser unit 21 may display a login screen for accessing the server apparatus 10 on a display device of the client apparatus 20 based on a webpage downloaded from the server apparatus 10, for example.

When a user inputs information such as a user name to the login screen, the browser unit 21 transmits an HTTP request representing a print data list request to the server apparatus 10 (S101). It is noted that the user name input to the login screen is specified in the print data list request transmitted from the browser unit 21. Upon receiving the print data list request, the list information providing unit 11 of the server apparatus 10 sends a print data list information acquisition request to the print data acquiring unit 12, specifying the user name provided in the print data list request from the browser unit 21 (S102). The print data acquiring unit 12 searches the print data stored in the print data storage unit 16 for print data associated with the specified user name (S103, S104). It is noted that the print data storage unit 16 stores print data in association with the user name of a print request originator. The print data acquiring unit 12 then sends print data list information corresponding to a list of bibliographic information of the print data associated with the specified user name to the list information providing unit 11 (S105).

In a preferred embodiment, the bibliographic information may include a job name as identification information of each set of print data, for example. The bibliographic information of each set of print data may be extracted from the print data, for example.

The list information providing unit 11 then generates HTML data for displaying the print data list information (print data list screen data) (S106). Then, the list information providing unit 11 sends a response (HTTP response) including the print data list screen data to the browser unit 21 (S107).

The browser unit 21 then prompts the display device of the client apparatus 20 to display a print data list screen based on the print data list screen data received from the list information providing unit 11 (S108). In a preferred embodiment, the print data list screen may display information such as the job name of each set of print data and enable selection of one or more sets of the displayed print data.

Figure 5:
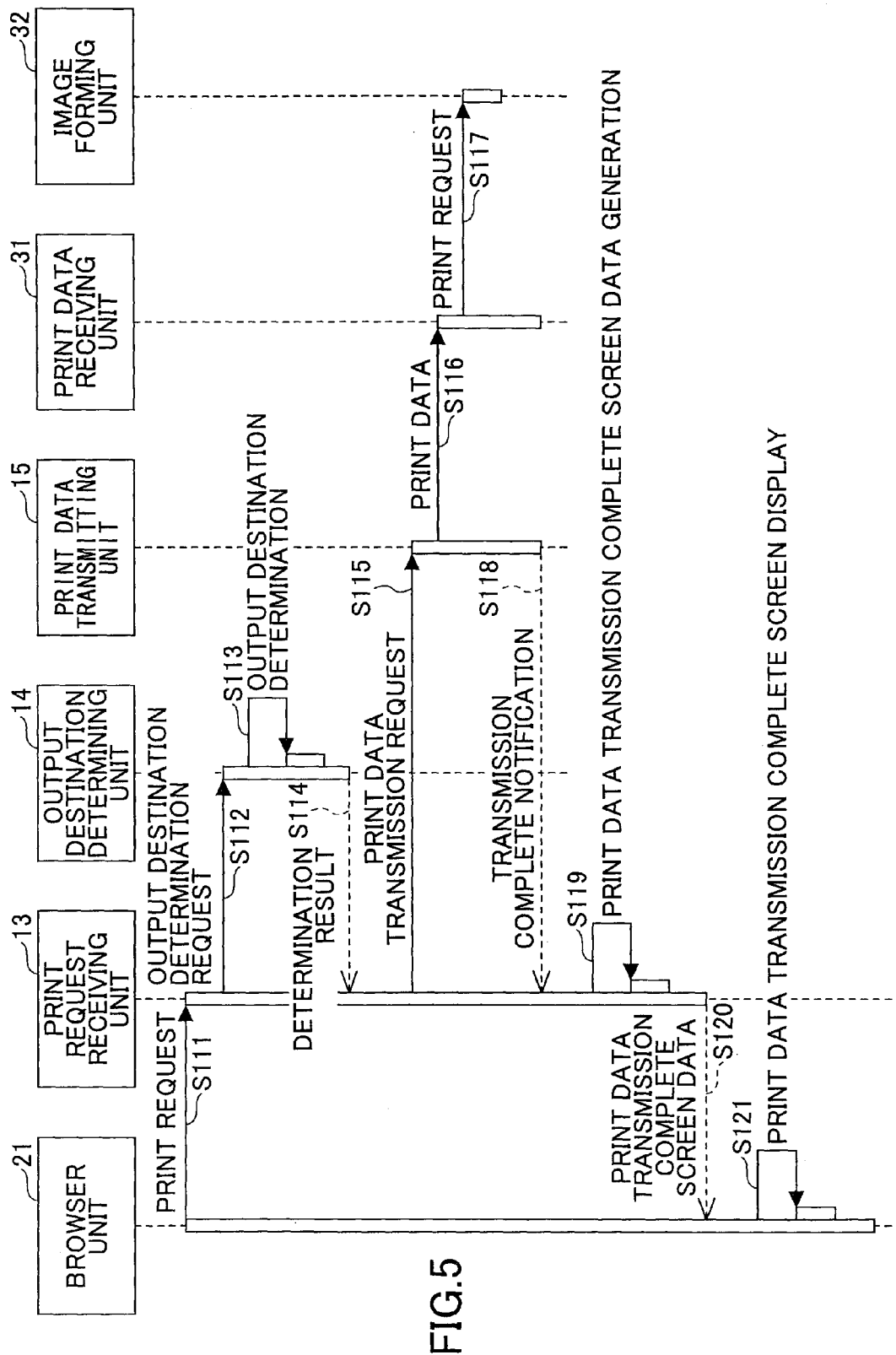
FIG. 5 is a sequence chart showing an exemplary sequence of process steps for printing selected print data according to the first embodiment.

FIG. 5 is a sequence chart showing an exemplary sequence of process steps for printing selected print data according to a first embodiment of the present invention.

When a user selects one or more job names from the print data list screen and inputs an output command, the browser unit 21 transmits a print request specifying the selected job name (referred to as "target job name" hereinafter) and identification information of the client apparatus 20 (referred to as "client identification information" hereinafter) to the server apparatus 10 (S111). The client identification information may be any type of information that enables identification of each individual client apparatus 20 such as the host name or IP address of the client apparatus 20. In the present embodiment, the IP address of the client apparatus is used as the client identification information.

Upon receiving a print request, the print request receiving unit 13 of the server apparatus 10 sends an output destination determination request to the output destination determining unit 14 to determine the image forming apparatus 30 corresponding to the print data output destination, specifying the client identification information provided in the print request (S112). The output destination determining unit 14 determines the image forming apparatus 30 corresponding to the print data output destination based on the specified client identification information and the determination information storage unit 17 (S113).

FIG. 6 is a table showing an exemplary configuration of the determination information storage unit 17 according to the first embodiment of the present invention. In FIG. 6, the determination information storage unit 17 stores client identification information in association with apparatus identification information corresponding to identification information of the image forming apparatus 30. It is noted that in the present embodiment, the IP address of the image forming apparatus 30 is used as the apparatus identification information. However, other types of information for identifying the image forming apparatus 30 such as the host name may be used as the apparatus identification information as well.

In the present embodiment, the determination information storage unit 17 preferably stores association information between the client identification information and the apparatus information (i.e., association information between the client apparatus 20 and the image forming apparatus 30) based on the physical proximity between the client apparatus 20 and the image forming apparatus 30. That is, in the determination information storage unit 17 of the present embodiment, a client apparatus 20 is associated with an image forming apparatus 30 that is located closest to this client apparatus 20.

It is noted that FIG. 6 represents the configuration of the determination information storage unit 17 in table form. However, the determination information storage unit 17 may actually be implemented in the form of a file as illustrated in FIG. 7A or 7B, for example.

FIGS. 7A and 7B are diagrams illustrating exemplary implementations of the determination information storage unit 17 according to embodiments of the present invention. FIG. 7A illustrates an example in which the determination information storage unit 17 is implemented by a property file. FIG. 7B illustrates an example in which the determination information storage unit 17 is implemented by a CSV (Comma Separated Values) file.

In step S113 of FIG. 5, the output destination determining unit 14 determines the image forming apparatus 30 identified by the apparatus identification information associated with the client information specified in the output destination determination request and identifies this image forming apparatus 30 as the output destination.

Then, the output destination determining unit 14 sends a response including the apparatus identification information of the image forming apparatus 30 identified as the output destination (referred to as "output destination identification information" hereinafter) to the print request receiving unit 13 (S114). Then, the print request receiving unit 13 inputs a print data transmission request specifying the target job name and the output destination identification information to the print data transmitting unit 15 (S115). The print data transmitting unit 15 acquires print data identified by the target job name from the print data storage unit 16 and sends the acquired print data to the image forming apparatus 30 identified by the output destination identification information (S116). In a preferred embodiment, the print data transmitting unit 15 may transmit the print data to the image forming apparatus 30 using a communication protocol that is the same communication protocol as that used by the print data receiving unit 31 of the image forming apparatus 30 to transmit print data to a port (e.g., Port 9100) that is provided for normal print data transmission, for example. In this way, versatile print data transmission from the print data transmitting unit 15 may be enabled. That is, print data may be transmitted to image forming apparatuses 30 of various models and/or various manufacturers by using a common or general-purpose communication protocol.

Upon receiving the print data, the print data receiving unit 31 of the image forming apparatus 30 sends a print request to the image forming unit 32 to execute a print job based on the print data. In turn, the image forming unit 32 executes the print job by forming an image based on the print data and printing the image.

At the server apparatus 10 side, after transmitting the print data to the image forming apparatus 30, the print data transmitting unit 15 sends a notification to the print request receiving unit 13 that the print data transmission has been completed (S118). In response to this notification, the print request receiving unit 13 generates HTML data for displaying a print data transmission complete screen (print data transmission complete screen data) for providing notice of the completion of the print data transmission (S119). Then, the print request receiving unit 13 sends a response (HTTP response) including the print data transmission complete screen data to the browser unit 21 (S120).

The browser unit 21 prompts the display device of the client apparatus 20 to display the print data transmission complete screen based on the print data transmission complete screen data included in the response (S121). The user may view this print data transmission complete screen to confirm that the print data have been transmitted to the image forming apparatus 30.

It is noted that in the above first embodiment of the present invention, operations on the print data accumulated at the server apparatus 10 are performed at the client apparatus 20 rather than at one or more of the individual image forming apparatuses 30. According to an aspect of the present embodiment, a uniform user interface (e.g., Graphical User Interface) may be provided regardless of the model or the manufacturer of the image forming apparatuses 30.

According to another aspect of the present embodiment, communication between the server apparatus 10 and the image forming apparatus 30 may be established using a standard or general-purpose communication protocol so that image forming apparatuses 30 of various models may be added as output destination candidates.

In the following, a second embodiment of the present invention is described. It is noted that features of the second embodiment that may be identical to those of the first embodiment are not described below.

FIG. 8 is a block diagram showing an exemplary configuration of a printing system according to the second embodiment of the present invention. The printing system in FIG. 8 includes a client apparatus 20a corresponding to a mobile terminal such as a tablet terminal. In the present embodiment, the client apparatus 20a may be easily movable and may establish communication with the server apparatus 10 via a wireless connection such as a wireless local area network. In one preferred embodiment, a client apparatus 20a may be provided at the side of each image forming apparatus 30. That is, instead of relying on the operations panel of the image forming apparatus 30, one of the client apparatuses 20a may be provided at each image forming apparatus 30. It is noted that the client apparatus 20a of the present embodiment is not limited to a tablet terminal and other mobile terminals such as a cell phone, a smart phone, or a personal digital assist (PDA) may be used as the client apparatus 20a.

It is noted that the printing system according to the second embodiment may perform process steps for displaying print data list information and printing selected print data in a manner similar to the process steps of FIGS. 4 and 5 of the first embodiment.

Figure 9A:
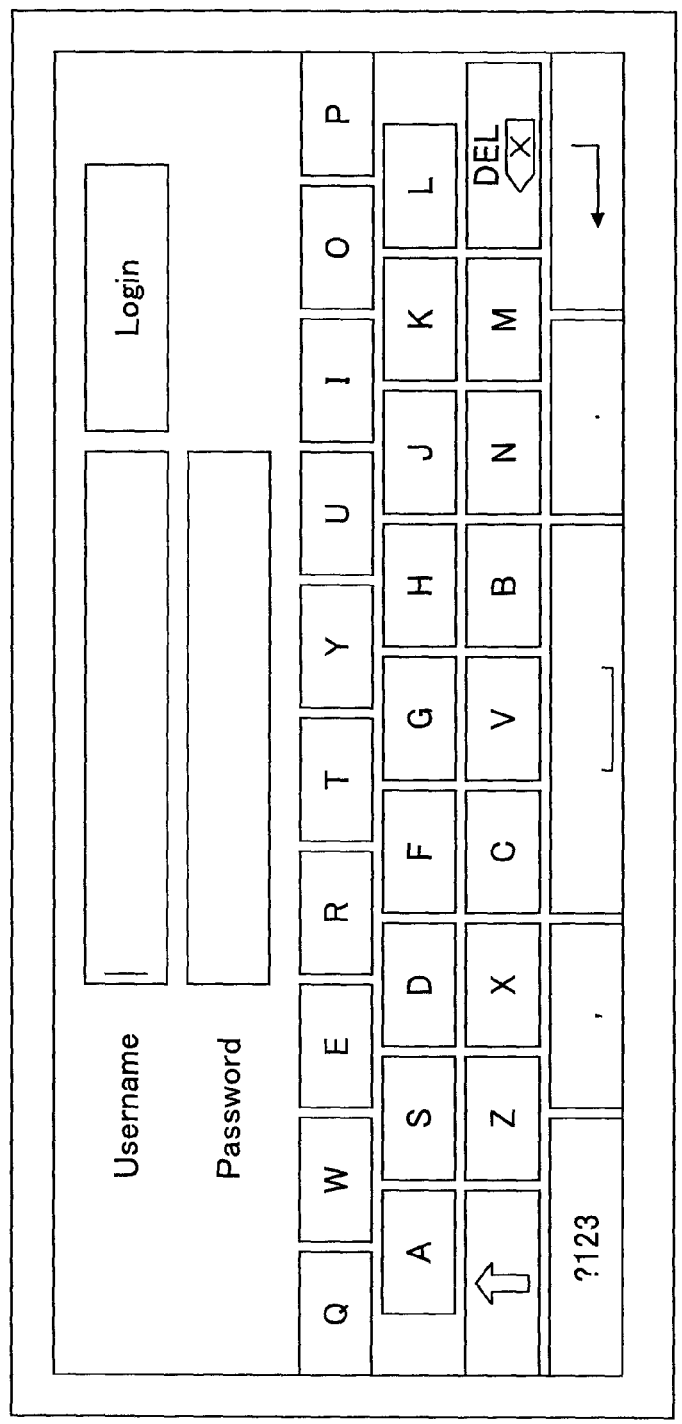
FIGS. 9A and 9B are diagrams illustrating exemplary screens that may be displayed on a display device of a client apparatus according to the second embodiment.
Figure 9B:
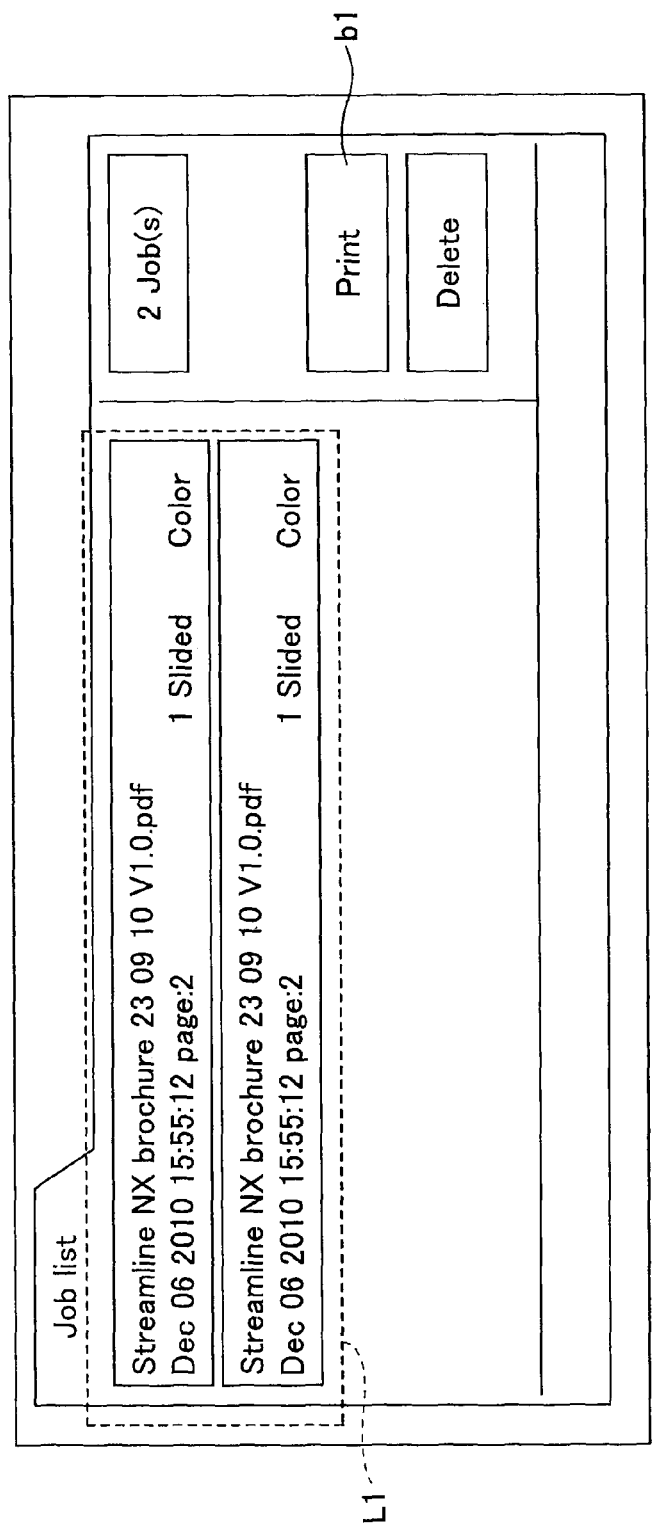

FIGS. 9A and 9B are diagrams illustrating exemplary screens that may be displayed on a display device of the client apparatus 20a.

FIG. 9A is an exemplary login screen that may be displayed at the client apparatus 20a in the initial default state. FIG. 9B is an exemplary print data list screen that may be displayed at the client apparatus 20a in a process step similar to step S108 of FIG. 4. The print data list screen of FIG. 9B includes a list L1 of one or more sets of print data (print jobs) and a print button b1. When a print job is selected from the list L1 and the print button b1 is touched, a print request may be sent in a manner similar to step S111 of FIG. 5, for example.

In the following, a third embodiment of the present invention is described. It is noted that features of the third embodiment that may be identical to those of the first embodiment are not described below. In the printing system according to the third embodiment, the client apparatus 20 may be a mobile terminal such as a tablet terminal or a stationary information processing apparatus such as a desktop computer.

Figure 10:
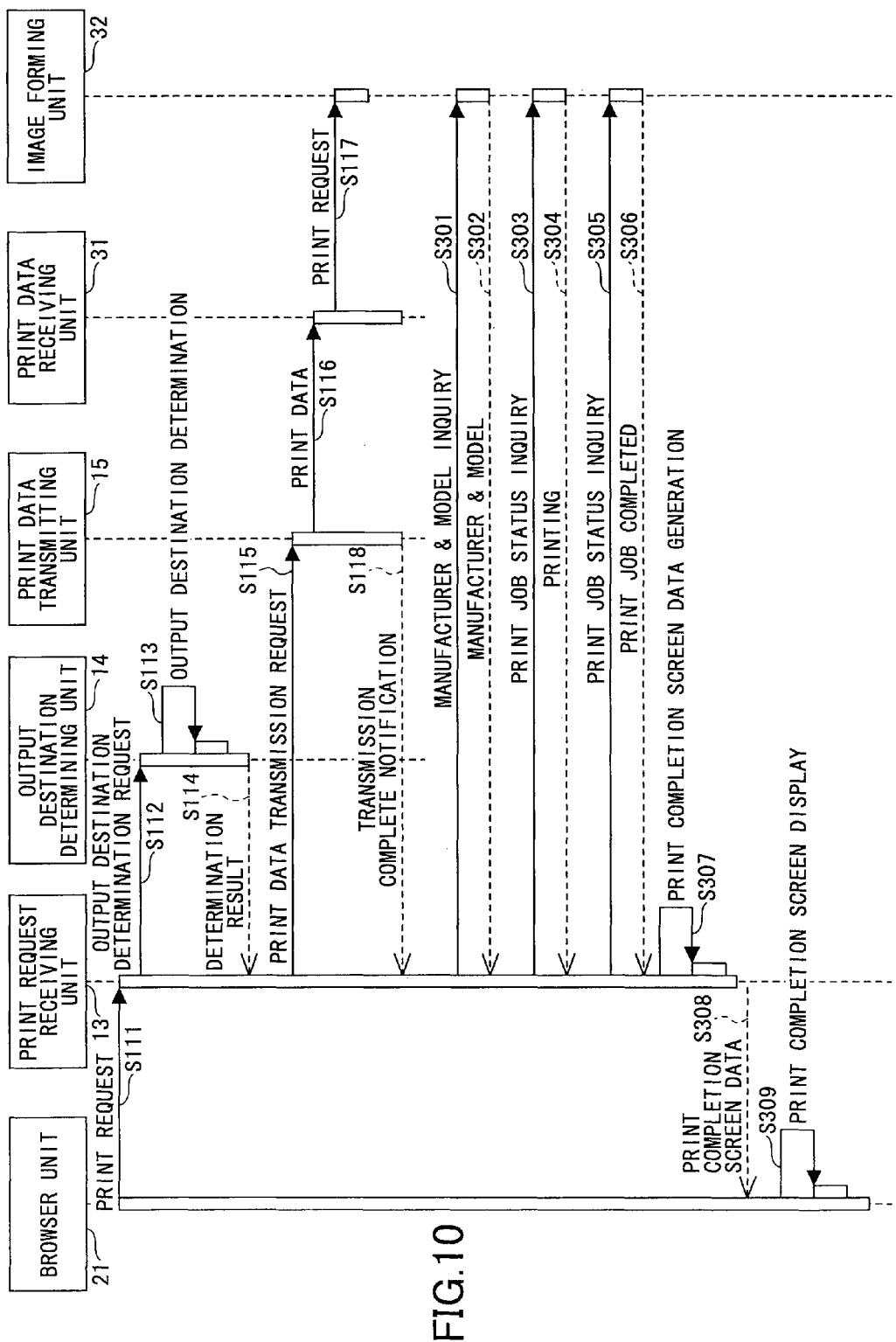
FIG. 10 is a sequence chart showing an exemplary sequence of process steps for printing selected print data according to a third embodiment of the present invention.

FIG. 10 is a sequence chart showing an exemplary sequence of process steps for printing selected print data according to the third embodiment of the present invention. It is noted that in FIG. 10, process steps that may be identical to the process steps of FIG. 4 are given the same reference numerals and their descriptions are omitted.

In FIG. 10, after receiving notification of the completion of print data transmission (S118), the print request receiving unit 13 acquires information on the manufacturer and model of the image forming apparatus 30 corresponding to the output destination (S301, S302). The information on the manufacturer and the model of the image forming apparatus 30 may be acquired from the MIB (Management Information Base) of the image forming apparatus 30, for example.

Then, the print request receiving unit 13 acquires information on the print job status from the output destination image forming apparatus 30 (S303, S304). The information on the print job status may be acquired from the MIB of the image forming apparatus 30, for example. It is noted that the MIB entry at which the print job status is recorded may vary depending on the manufacturer and/or model of the image forming apparatus 30. Thus, in the present embodiment, the print request receiving unit 13 may change its method of acquiring the print job status information in accordance with the information on the manufacturer and/or model of the output destination image forming apparatus 30 acquired in step S304. That is, the print request receiving unit 13 may acquire the print job status information from different MIB entries depending on the manufacturer and/or model of the image forming apparatus 30. If the print job is not yet completed, the print job status information acquisition steps may be repeated at predetermined intervals, for example (S305, S306).

Upon detecting the completion of a print job based on the print job status information, the print request receiving unit 13 generates HTML data for displaying a print completion screen (print completion screen data) that provides notice of the completion of the print job (S307). Then, the print request receiving unit 13 sends a response (HTTP response) including the print completion screen data to the browser unit 21 (S308).

In turn, the browser unit 21 prompts the display device of the client apparatus 20 to display the print completion screen based on the print completion screen data included in the response (S309).

Figure 11:
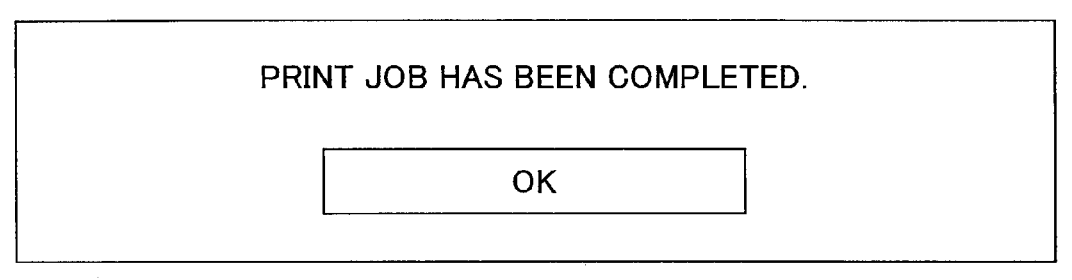

FIG. 11 is a diagram showing an exemplary print completion screen that may be displayed at the client apparatus 20. By viewing the print completion screen as shown in FIG. 11, a user may confirm that the print job has been completed.

In one preferred embodiment, the print request receiving unit 13 may also send a response including the print data transmission complete screen data to the browser unit 21 immediately after receiving a print data transmission complete notification in step S118.

According to an aspect of the above third embodiment, a print completion notification is sent to the client apparatus 20 so that a user may immediately confirm whether a print job has been completed by the image forming apparatus 30. In this way, a user may be able to detect a problem when the image forming apparatus 30 has stopped operating, for example.

In the following, a fourth embodiment of the present invention is described. The printing system according to the fourth embodiment uses the client apparatus 20a corresponding to a mobile terminal such as a tablet terminal. It is noted that features of the fourth embodiment that may be identical to those of the second embodiment are not described below.

Figure 12:
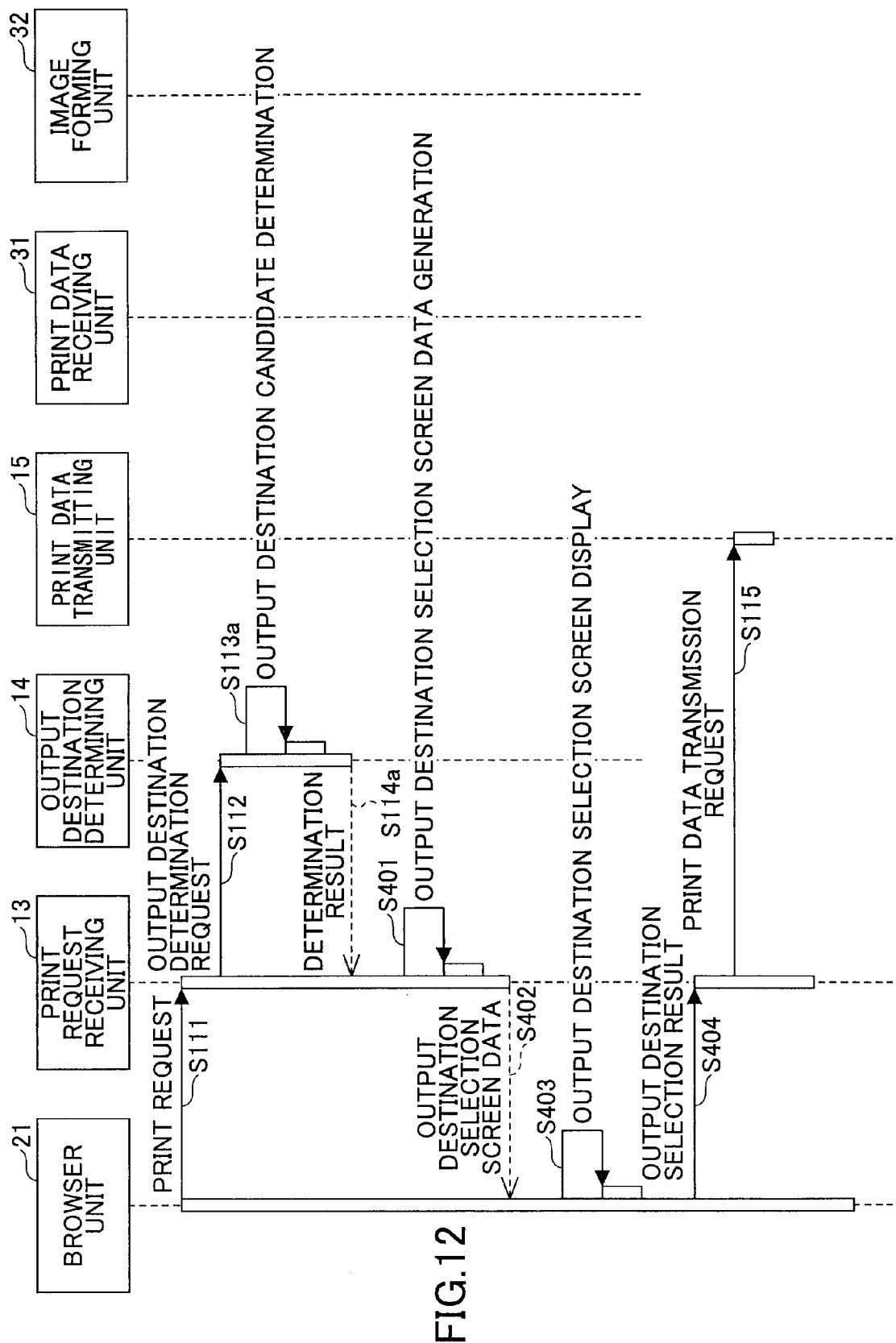
FIG. 12 is a sequence chart showing an exemplary sequence of process steps for printing selected print data according to a fourth embodiment of the present invention.

FIG. 12 is a sequence chart showing an exemplary sequence of process steps for printing selected print data according to the fourth embodiment. It is noted that process steps of FIG. 12 that are identical to those of FIG. 5 are given the same reference numerals and their descriptions are omitted.

In step S113a of FIG. 12, the output destination determining unit 14 determines the image forming apparatus 30 corresponding to an output destination candidate based on client identification information specified in the output destination determination request received in step S112 and the determination information storage unit 17.

Figures 13, 14:
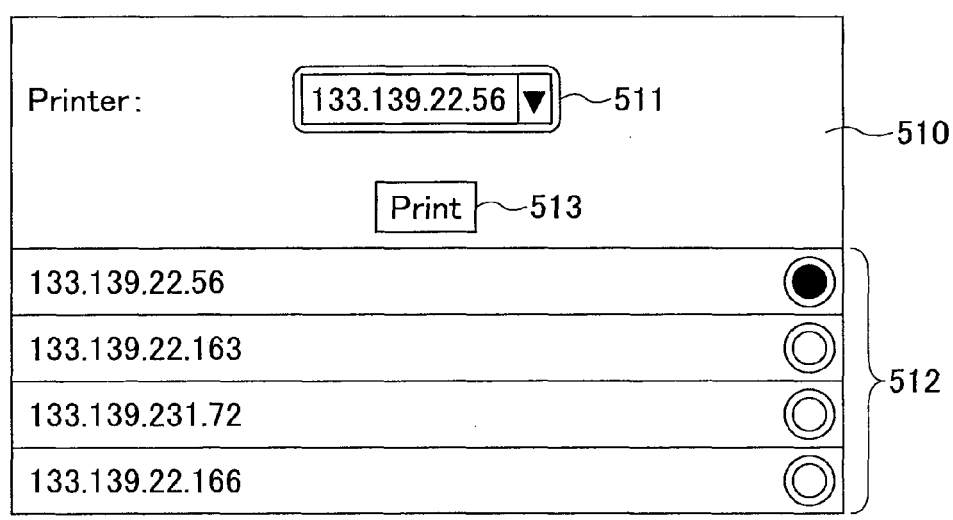
FIG. 13 is a table illustrating an exemplary configuration of a determination information storage unit according to the fourth embodiment.
FIG. 14 is a diagram showing an exemplary output destination selection screen.

FIG. 13 is a table illustrating an exemplary configuration of the determination information storage unit 17 according to the fourth embodiment. In FIG. 13, the determination information storage unit 17 stores client identification information in association with the apparatus identification information of one or more image forming apparatuses 30. That is, in the present embodiment, one client apparatus 20 may be associated with plural image forming apparatuses 30.

According to an aspect of the present embodiment, since the client apparatus 20a is a mobile terminal such as a tablet terminal that is easily portable, the client apparatus 20a does not necessarily have to be provided for each output destination image forming apparatus 30 and the client apparatus 20a may instead be used for plural image forming apparatuses 30. In one preferred embodiment, one client apparatus 20a may be associated with one or more image forming apparatuses 30 that are available to the user of this client apparatus 20a. For example, in a case where the image forming apparatuses 30 available to a user correspond to the image forming apparatuses 30 of the department to which the user belongs, the image forming apparatuses 30 of this department may be associated with the client apparatus 20a of this user.

Accordingly, in step S113a of FIG. 12, the output destination determining unit 14 identifies one or more sets of apparatus identification information associated with the specified client identification information as the apparatus identification information of one or more output destination candidates. Then, the output destination determining unit 14 sends a response including the one or more sets of apparatus identification information of the output destination candidates (referred to as "output destination candidate identification information" hereinafter) to the print request receiving unit 13 (S114a).

In turn, the print request receiving unit 13 generates HTML data for displaying an output destination selection screen that enables selection of the image forming apparatus 30 that is to be the output destination (output destination selection screen data) (S401). For example, the output destination selection screen may include a list of output destination candidate identification information. Then, the print request receiving unit 13 sends a response (HTTP response) including the output destination selection screen data to the browser unit 21 (S402).

The browser unit 21 then prompts the display device of the client apparatus 20a to display the output destination selection screen based on the output destination selection screen data included in the response (S403).

FIG. 14 is a diagram showing an exemplary output destination selection screen. In FIG. 14, an output destination selection screen 510 includes a list box 511, a list 512, and a print button 513. When a button (triangular portion) of the list box 511 is touched, a list of output destination candidate identification information is displayed at the list 512. The list box 511 displays the output destination candidate identification information on the line of the list 512 that has been touched (selected).

When a selection is made on the list 512 of the output destination candidate identification information and the print button 513 of the output destination selection screen 510 is touched, the browser unit 21 transmits the selected output destination candidate information to the server apparatus 10 (S404).

Upon receiving the selected output destination candidate identification information, the print request receiving unit 13 treats the selected output destination candidate identification information as the output destination identification information and proceeds to step S115 for sending a print data transmission request. It is noted that process steps after step S115 of the present embodiment may be identical to the process steps of FIG. 5 so that their descriptions are omitted.

According to an aspect of the present embodiment, taking advantage of the portability of the client apparatus 20a, the user of the client apparatus 20a may be able to select a desired image forming apparatus 30 as the output destination from plural image forming apparatuses 30.

In one preferred embodiment, process steps similar to steps S301-S309 of FIG. 10 may be performed along with steps S401-S404 of the present embodiment. In this case, the output destination determining unit 14 may exclude an output destination image forming apparatus 30 from being identified as an output destination candidate until a print job of this image forming apparatus 30 has been completed.

For example, the print request receiving unit 13 may store the selected output destination candidate identification information (output destination identification information) transmitted in step S404 in the memory device 103 as subject to exclusion control. Upon receiving notification that the print job of the image forming apparatus 30 identified by this output destination identification information has been completed (S306), the print request receiving unit 13 may remove this output destination identification information from the memory device 103. On the other hand, when apparatus identification information of image forming apparatuses 30 determined to be output destination candidates in step S113a (output destination candidate identification information) includes apparatus identification information corresponding to output destination identification information stored in the memory device 103 as subject to exclusion control, the output destination determining unit 14 may exclude the corresponding apparatus identification information from the output destination candidate identification information. In this way, an image forming apparatus 30 may be excluded from being an output destination candidate until a print job of this image forming apparatus 30 has been completed.

According to an aspect of the present embodiment, security for printed matter may be ensured. When operations on an image forming apparatus 30 are not performed at the image forming apparatus 30, plural users may perform on-demand printing operations on the same image forming apparatus 30 substantially at the same time. In such a case, documents of plural users may be mixed up in an output tray of the image forming apparatus 30 so that security of printed matter in on-demand printing may be a concern.

By excluding an output destination image forming apparatus 30 until a print job of the image forming apparatus 30 has been completed, documents of plural users may be prevented from getting mixed up so that security of printed matter may be ensured, for example.

In another preferred embodiment, instead of having the output destination determining unit 14 exclude the apparatus identification information of an image forming apparatus 30 that has not yet completed a print job from the output destination candidate identification information included in the response to be sent in step S114a, the output destination determining unit 14 may provide flag information indicating that the apparatus identification information is excluded from the output destination candidate identification information. In this embodiment, the print request receiving unit 13 may generate the output destination selection screen data in a manner such that the output destination candidate identification information having such flag information attached thereto may be grayed out (cannot be selected), for example. In this way, a user viewing the output destination selection screen may be able to determine the image forming apparatus 30 that is currently unavailable to the user of the image forming apparatuses 30 normally available to the user as output destinations.

In the following, a fifth embodiment of the present invention is described. It is noted that features of the fifth embodiment that may be identical to those of the fourth embodiment are not described below.

Figure 15:
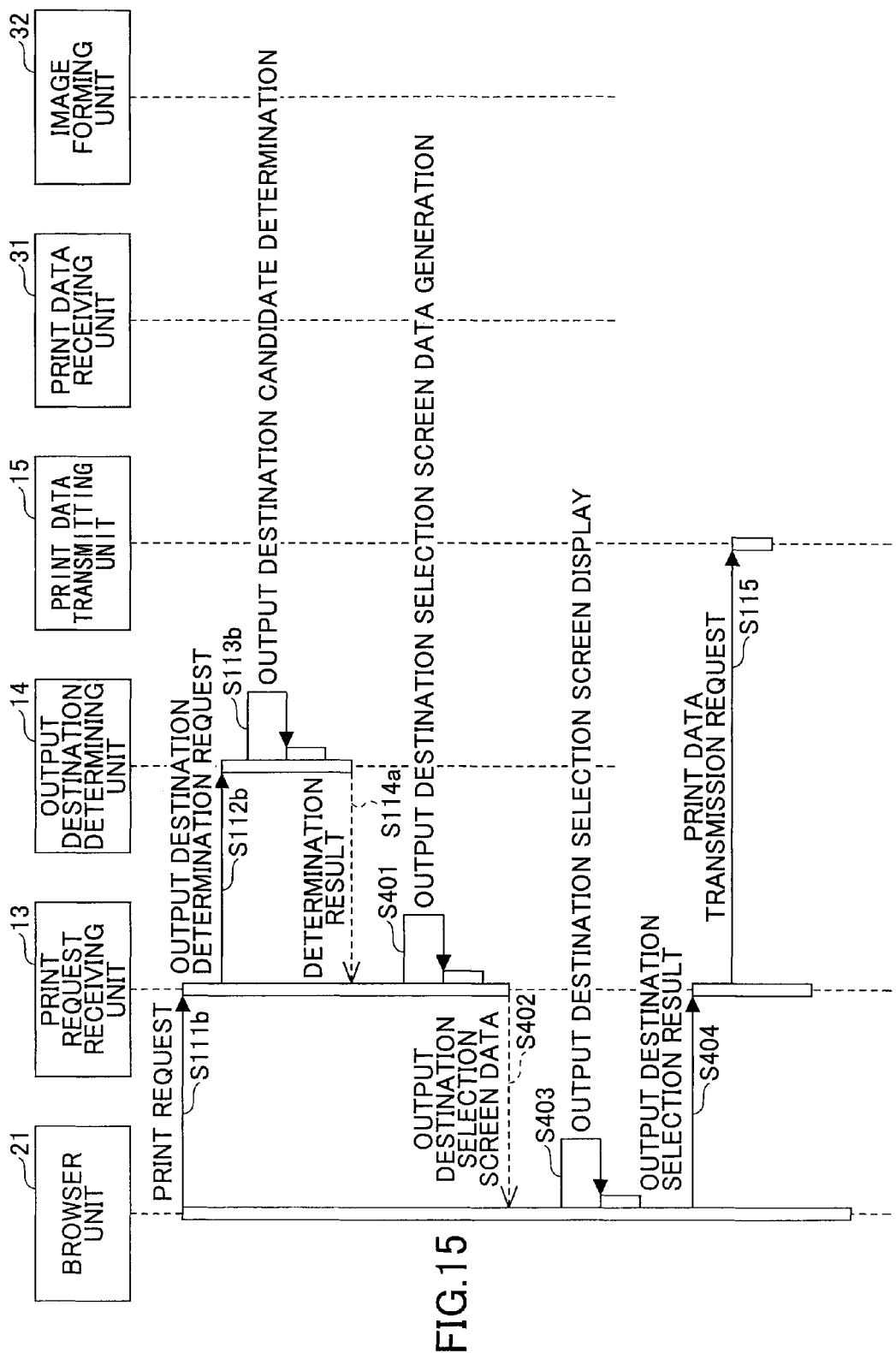
FIG. 15 is a sequence chart showing an exemplary sequence of process steps for printing selected print data according to a fifth embodiment of the present invention.

FIG. 15 is a sequence chart showing an exemplary sequence of process steps for printing selected print data according to the fifth embodiment. It is noted that process steps of FIG. 15 that are identical to those of FIG. 12 are given the same reference numerals and their descriptions are omitted.

In FIG. 15, the browser unit 21 transmits a print request that specifies the target job name and position information of the client apparatus 20a (S111b). The position information of the client apparatus 20a may be measured by a Global Positioning System (GPS) receiver of the client apparatus 20a, for example. In one preferred embodiment, the position information may include altitude, latitude, and longitude information. However, altitude information may not be included in a case where the workplace or space where the image forming apparatuses 30 are located does not extend over multiple floors.

Upon receiving the print request, the print request receiving unit 13 of the server apparatus 10 may send a request to the output destination determining unit 14 to determine the image forming apparatus 30 corresponding to the output destination, specifying the position information of the client apparatus 20a provided in the print request (S112b). In turn, the output destination determining unit 14 may identify one or more image forming apparatuses 30 that may be output destination candidates based on the position information specified in the request from the print request receiving unit 13 and the determination information storage unit 17.

FIG. 16 is a table illustrating an exemplary configuration of the determination information storage unit 17 according to the fifth embodiment. In FIG. 16, the determination information storage unit 17 stores corresponding apparatus position information for each set of apparatus identification information (i.e., each image forming apparatus 30). In the example shown in FIG. 16, the apparatus position information is represented in the following format: "altitude, latitude, longitude."

In the present embodiment, the output destination determining unit 14 may identify one or more image forming apparatuses 30 as output destination candidates by comparing the position information of the client apparatus 20a with the apparatus position information of each image forming apparatus 30 to determine the image forming apparatuses 30 that are located relatively close to the client apparatus 20a (S113b). Then, the output destination determining unit 14 sends a response including the apparatus identification information of the output destination candidates (output destination candidate identification information) to the print request receiving unit 13 in a manner identical to step S114a of FIG. 12.

It is noted that process steps after step S113b of the present embodiment may be identical to those of the fourth embodiment so that their descriptions are omitted.

In the following, the process step for determining the output destination candidates according to the present embodiment is described.

FIG. 17 is a flowchart illustrating an exemplary sequence of process steps for determining output destination candidates based on position information.

In step S501 of FIG. 17, the output destination determining unit 14 extracts from the determination information storage unit 17 a record of an image forming apparatus 30 having as position information an altitude within a predetermined value with respect to the altitude of the client apparatus 20a. That is, the altitude difference between the image forming apparatus 30 and the client apparatus 20a is determined and the output destination determining unit 14 extracts the record of the image forming apparatus 30 if the altitude difference is within a predetermined value. For example, the predetermined value may be set to a value for determining whether an image forming apparatus 30 is located on the same floor as the client apparatus 20a (e.g., 5 meters). In this way, one or more records of image forming apparatuses 30 that are most likely located on the same floor as the floor on which the user of the client apparatus 20a is currently located may be extracted in step S501.

Then, the output destination determining unit 14 determines whether one or more records have been extracted in step S501 (S502). If no records are extracted (NO in S502), the output destination determining unit 14 determines that there are no output destination candidates (S510).

When one or more records are extracted (YES in S502), the output destination determining unit 14 extracts one or more records of image forming apparatuses 30 that are within a fifty-meter radius of the client apparatus 20a (S503). That is, assuming Record Group A represents the group of one or more records extracted in step S501, one or more records of image forming apparatuses 30 that are within a fifty-meter radius of the client apparatus 20a are extracted from Record Group A. It is noted that the distance between the client apparatus 20a and an image forming apparatus 30 may be calculated based on the latitude and longitude of the client apparatus 20a and the latitude and longitude of the image forming apparatus 30 included in the one or more records extracted in step S501.

When no records are extracted in step S503 (NO in step S504), the output destination determining unit 14 extracts one or more records of image forming apparatuses 30 that are within a one-hundred-meter radius of the client apparatus 20a from Record Group A (S505). When no records are extracted in step S505 (NO in step S506), the output destination determining unit 14 extracts one or more records of image forming apparatuses 30 that are within a two-hundred-meter radius of the client apparatus 20a from Record Group A (S507). When no records are extracted in step S507 (NO in step S508), the output destination determining unit 14 determines that there are no output destination candidates (S510).

On the other hand, when one or more records are extracted in step S503, S505, or S507 (YES in step S504, YES in step S506, or YES in step S508), the apparatus identification information included in the one or more extracted records is identified as the output destination candidate determination result (output destination candidate information) (S509).

In the present example, when determining output destination candidates among the image forming apparatuses 30 located on the same floor, priority is given to an image forming apparatus 30 that is close to the client apparatus 20a. It is noted that determining output destination candidates within a predetermined radius of the client apparatus 20a is merely one illustrative example. In another example, all image forming apparatuses 30 located on the same floor may be output destination candidates. In yet another example, image forming apparatuses located on plural floors may be output destination candidates. In such a case, the predetermined value used in step S501 may be adjusted accordingly.

According to an aspect of the fifth embodiment, in determining and presenting output destination candidates, priority may be given to image forming apparatuses 30 that are relatively close to the client apparatus 20a. In this way, a user carrying the client apparatus 20a may be able to perform on-demand printing using an image forming apparatus 30 that is close to where the user is currently located, for example.

It is noted that the list information providing unit 11 is an exemplary implementation of a data list providing unit of the present invention. The print request receiving unit 13 is an exemplary implementation of a print request receiving unit, an apparatus list providing unit, an output destination receiving unit, and a monitoring unit of the present invention. The output destination determining unit 14 is an exemplary implementation of a first transmission destination determining unit and a second transmission destination determining unit of the present invention. The print data transmitting unit 15 is an exemplary implementation of a transmitting unit of the present invention.

Further, the present invention is not limited to the above embodiments, and numerous variations and modifications may be made without departing from the scope of the present invention.

The present application is based on and claims the benefit of the priority data of Japanese Patent Application No. 2011-230961 filed on Oct. 20, 2011, with the Japanese Patent Office, the entire contents of which are hereby incorporated by reference.

The invention claimed is:
1. An information processing apparatus comprising:
a memory storing a program; and
a processor executing the program to implement processes of
storing determination information including output apparatus identification information and client apparatus identification information in association with each other, the output apparatus identification information identifying one of one or more output apparatuses, the client apparatus identification information identifying a client apparatus located alongside the output apparatus of the associated output apparatus identification information and operated by a user at the output apparatus of the associated apparatus identification information as an operation panel of the associated output apparatus identification information;
storing output data received via a network;
transmitting, in response to a request of list information from the client apparatus located alongside the out- put apparatus, list information of the stored output data to the client apparatus;

receiving, from the client apparatus displaying a list of the output data based on the list information, an output request of the stored output data and selected from the list of the output data; and transmitting the output data, in response to receiving the output request, to the output apparatus of which the output apparatus identification information is associated with the client apparatus identification information of the client apparatus sending the output request in the determination information.

2. The information processing apparatus as claimed in claim 1, wherein the processor executes the program to further implement a process of:

determining a transmission destination of the output data dynamically, without being based on user selection;

wherein the processor receives the output request including the client apparatus identification information of the client apparatus requesting to output;

the processor identifies the output apparatus as the transmission destination based on the received client apparatus identification information and the determination information; and the processor transmits the output data to the output apparatus identified as the transmission destination.

3. The information processing apparatus as claimed in claim 1, wherein the output apparatus identification information associated with the client apparatus identification information in the determination information indicates that the associated client apparatus permits to request the associated output apparatus to output.

4. The information processing apparatus as claimed in claim 1, wherein the client apparatus identification information identifies a client apparatus located closest in physical proximity to the output apparatus of the associated output apparatus identification information.

5. A printing system comprising:

one or more sets of a client apparatus and an output apparatus; and an information processing apparatus including
a memory storing a program; and
a processor executing the program to implement processes of storing determination information including output apparatus identification information and client apparatus identification information in association with each other, the output apparatus identification information identifying one of one or more output apparatuses, the client apparatus identification information identifying a client apparatus located alongside the output apparatus of the associated output apparatus identification information and operated by a user at the output apparatus of the associated apparatus identification information as an operation panel of the associated output apparatus identification information;

storing output data received via a network, the output data not being received from the client apparatus;

transmitting, in response to a request of list information from the client apparatus located alongside the output apparatus, list information of the stored output data to the client apparatus;

receiving, from the client apparatus displaying a list of the output data based on the list information, an output request of the stored output data and selected from the list of the output data; and transmitting the output data in response to receiving the output request, to the output apparatus of which the output apparatus identification information is associated with the client apparatus identification information of the client apparatus sending the output request in the determination information.

6. The printing system as claimed in claim 5, wherein the processor executes the program to further implement a process of:

determining a transmission destination of the output data dynamically, without being based on user selection;

wherein the processor receives the output request including the client apparatus identification information of the client apparatus requesting to output;

the processor identifies the output apparatus as the transmission destination based on the received client apparatus identification information and the determination information; and the processor transmits the output data to the output apparatus identified as the transmission destination.

7. The printing system as claimed in claim 5, wherein the output apparatus identification information associated with the client apparatus identification information in the determination information indicates that the associated client apparatus permits to request the associated output apparatus to output.

8. A printing method implemented by a computer, the method comprising:

a first determination information storing step of storing determination information including output apparatus identification information and client apparatus identification information in association with each other, the output apparatus identification information identifying one of one or more output apparatuses, the client apparatus identification information identifying a client apparatus located alongside the output apparatus of the associated output apparatus identification information and operated by a user at the output apparatus of the associated apparatus identification information as an operation panel of the associated output apparatus identification information;

an output data storing step of storing output data received via a network;

a data list providing step of transmitting, in response to a request of list information from the client apparatus located alongside the output apparatus, list information of output data stored in the output data storage step to the client apparatus;

an output request receiving step of receiving, from the client apparatus displaying a list of the output data based on the list information, an output request of the output data stored in the output data storing step and selected from the list of the output data; and a transmitting step of transmitting the output data, in response to receiving the output request, to the output apparatus of which the output apparatus identification information is associated with the client apparatus identification information of the client apparatus sending the output request in the determination information.

9. The printing method as claimed in claim 8, further comprising:

a first transmission destination determining step of determining a transmission destination of the output data dynamically, without being based on user selection;

wherein the output request receiving step includes receiving the output request including the client apparatus identification information of the client apparatus requesting to output;

the first transmission destination determining step includes identifying the output apparatus as the transmission destination based on the client apparatus identification information received by the output request receiving step and the determination information; and the transmitting step includes transmitting the output data to the output apparatus identified as the transmission destination by the first transmission destination determining step.

10. The printing method as claimed in claim 8, wherein the output apparatus identification information associated with the client apparatus identification information in the determination information indicates that the associated client apparatus permits to request the associated output apparatus to output.

11. The printing method as claimed in claim 8, wherein the client apparatus identification information identifies a client apparatus located closest in physical proximity to the output apparatus of the associated output apparatus identification information.

* * * * *